No. 744,567. PATENTED NOV. 17, 1903.
H. KRUSEMARK.
MALT BREAKING MILL.
APPLICATION FILED FEB. 13, 1902.

NO MODEL.

Witnesses:

Inventor:
Hans Krusemark
by
Attorney

No. 744,567. Patented November 17, 1903.

UNITED STATES PATENT OFFICE.

HANS KRUSEMARK, OF DRESDEN, GERMANY.

MALT-BREAKING MILL.

SPECIFICATION forming part of Letters Patent No. 744,567, dated November 17, 1903.

Application filed February 13, 1902. Serial No. 93,982. (No model.)

*To all whom it may concern:*

Be it known that I, HANS KRUSEMARK, a citizen of the Empire of Germany, residing at Dresden, in the Kingdom of Saxony, Empire of Germany, have invented a new and useful Malt-Breaking Mill, of which the following is a specification.

My invention relates to improvements in malt-breaking mills in which two pairs of rollers are arranged one above the other and a reciprocating sieve between them; and the objects of my improvement are, first, to so arrange the sieve that the broken malt coming from the upper rollers may be divided into husks and semolina or flour and that the husks alone may be conducted to the lower rollers; second, to make the lower rollers smooth and to provide means for giving either both the same peripheral velocity or the one roller a peripheral velocity slightly in excess of that of the other roller; third, to provide means for collecting the husks coming from the lower rollers and the semolina or flour coming from the sieve, and, fourth, to provide means for turning at pleasure either the husks or the semolina and flour from the sieve onto the lower rollers. I attain these objects by the machine illustrated in the accompanying drawings, in which—

Figure 1:
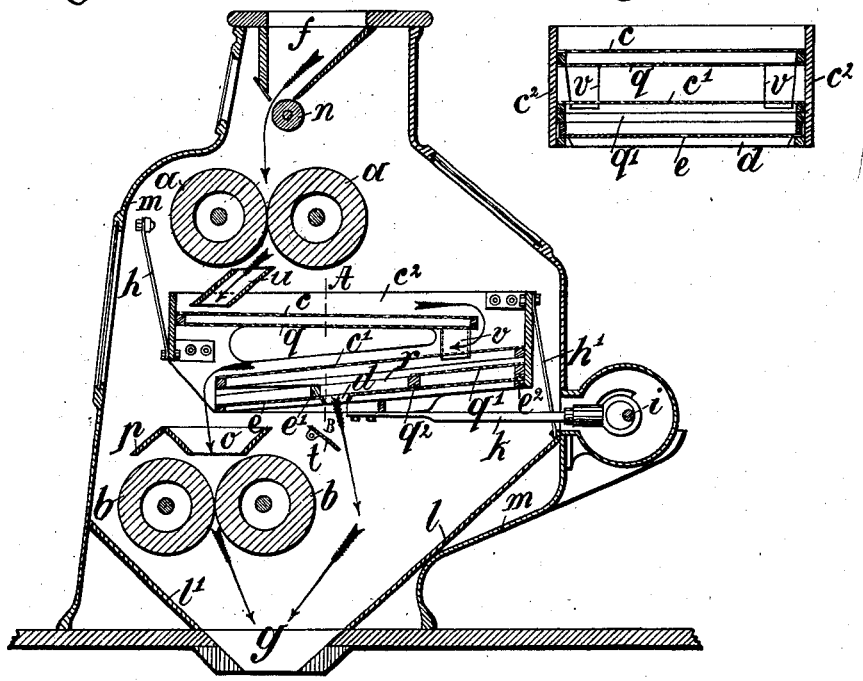
Figure 2:
Figure 1A:
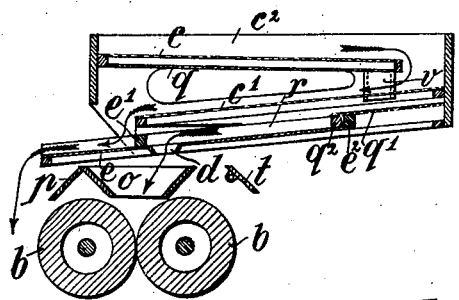

Figure 1 is a vertical cross-section through the machine. Fig. 1$^a$ is a part of Fig. 1 to show another position of the slide in the sieve-frame, and Fig. 2 is a longitudinal section through the sieve on the line A B in Fig. 1.

Similar letters of reference refer to similar parts throughout the several views.

In a frame of any known and approved construction the upper rollers $a$ $a$ and the lower rollers $b$ $b$ are mounted to revolve. Means of any known construction are applied for regulating the distance of the rollers in each pair from each other. The rollers are inclosed by a casing $m$ in the ordinary manner. Between the two roller pairs the reciprocating sieve-frame $c^2$ is suspended from the inner walls of the casing $m$ by springs $h$ or the like and supported by springs $h'$ or the like. It may be reciprocated by suitable means—as, for example, the eccentric shaft $i$ and the rod $k$ shown. The sieve-frame is preferably provided with two sieves $c$ and $c'$ for facilitating the separation of the husks with the adhering semolina from the semolina and flour detached. The sieve-frame has beneath its bottom $q'$ a slide $e$, provided with an aperture $d$. The slide $e$ closes the opening $r$ of the bottom $q'$ and may be shifted from the position shown in Fig. 1 to that shown in Fig. 1$^a$. On the slide $e$ are secured the two cleats $e'$ and $e^2$, of which the one $e^2$ may strike against the cleat $q^2$, secured to the bottom $q'$ to limit the motion of the slide $e$. The casing $m$ is provided internally with slanting walls $l$ $l'$, forming a hopper with the opening $g$. Moreover, the casing is provided with a hopper $f$ and a feeding-roller $n$, as usual.

The malt grains are introduced into the hopper $f$ and passed through the upper rollers $a$ $a$ in the direction of the arrows. As a rule, the rollers $a$ $a$ are preferably so adjusted as to obtain in the bruised malt medium-sized semolina and large husks. The broken malt falling from the rollers $a$ $a$ is conducted through a channel $u$ to the upper sieve $c$. Here a part of the semolina and flour is separated from the husks, with the semolina adhering thereto, and is collected on the bottom $q$, on which it slides down until it falls through the two side channels $v$ (see Fig. 2) on the bottom $q'$, beneath the lower sieve $c'$. The remainder passes over the upper sieve $c$ in the direction of the arrow to the lower sieve $c^2$, where another part of the semolina and flour is separated. The slide $e$ usually occupying the position indicated in Fig. 1, the semolina and flour separated by the sieves $c$ and $c'$ will be allowed to fall through the apertures $r$ and $d$ past the deflecting-plate $t$ down on the hopper-wall $l$. The husks, with the adhering semolina, take their course in the direction of the arrow over the lower sieve and fall into the hopper $o$. On passing through the lower rollers $b$ $b$ the semolina adhering to the husks will be crushed and partly separated, while the husks will be merely flattened and otherwise retained intact as far as possible owing to the smoothness of the rollers $b$ $b$ and also to there being little or no difference in velocity between them. If there are any flour particles still adhering to the husks, by the crushing operation they are rendered capable of easily separating themselves from the husks during the mashing. The flattened husks with the semolina crushed and detached leaving the lower rollers $b\ b$ will fall on the hopper-wall $l'$ and mix with the semolina and flour coming from the hopper-wall $l$ in the aperture $g$. Of course the husks will be mixed with the semolina and flour in exactly the same proportion as they were on leaving the upper rollers. The bruised malt thus produced in the machine will be of an excellent kind, most suitable for brewing, distilling, or yeast-making purposes.

For certain purposes it may be preferable to further break the semolina, in which case it is only necessary to shift the slide $e$ from the position shown in Fig. 1 to that indicated by Fig. 1ª. Then the husks, with the adhering semolina, coming from the sieves will be caught by the forward part of the slide $e$ and so conducted as to fall down the chute $p$ past the lower rollers, as indicated by the arrow in Fig. 1ª. The semolina and flour separated, on the contrary, will be caused by the aperture $d$ of the slide $e$ to fall into the hopper $o$ and pass through the lower rollers $b\ b$ to be further reduced. The reduced semolina and flour are again mixed with the husks with the adhering semolina, and the bruised malt thus produced may be used after leaving the machine.

The machine described so far may be varied in its construction without departing from the spirit of my invention.

What I claim as my invention, and desire to secure by Letters Patent, is—

1. In a malt-breaking mill, the combination with a pair of breaking-rollers, of a pair of smooth rollers arranged beneath said pair of breaking-rollers and so geared as to have the same peripheral velocity of rotation or nearly so, a sieve placed between said two pairs of rollers, means for reciprocating said sieve, means for conducting the broken malt from said pair of malt-breaking rollers to said seive, means for turning either the husks with the adhering semolina or the semolina and flour sifted out from said sieve onto said pair of smooth rollers, and a casing inclosing said two pairs of rollers, said sieve and said turning means being so formed as to collect and mix the two kinds of products on their exit, substantially as set forth.

2. In a malt-breaking mill, the combination with two pairs of rollers arranged one above the other, a sieve arranged between said two pairs of rollers for dividing the broken malt coming from the upper rollers into husks with the adhering semolina and semolina with flour, the husks being conducted to the lower rollers to be therein flattened, while the adhering semolina is crushed, said sieve being provided with a bottom having an aperture, a slide mounted beneath said bottom of said sieve, and provided with an aperture and a cleat, for catching the semolina and flour falling through said aperture in said bottom so that in the one extreme position the said slide allows the semolina and flour to fall freely and the husks to pass between the lower rollers, while in the other extreme position it catches the husks and allows them to fall freely, but leads the semolina and flour to the lower rollers to be therein reduced, and a casing inclosing said two pairs of rollers and said sieve and being so formed as to collect and to mix the two kinds of products on their exit, substantially as set forth.

In witness whereof I have hereunto signed my name, this 24th day of December, 1901, in the presence of two subscribing witnesses.

HANS KRUSEMARK.

Witnesses:
CHRISTIAN EMIL OSCAR DERSCHOSY,
WILHELM REINHARD.